US006417129B2

(12) United States Patent
Brown

(10) Patent No.: US 6,417,129 B2
(45) Date of Patent: Jul. 9, 2002

(54) MIXED METAL CATALYSTS

(75) Inventor: Donna Marie Brown, Sugarland, TX (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 1 days.

(21) Appl. No.: 09/829,188

(22) Filed: Apr. 9, 2001

Related U.S. Application Data

(63) Continuation of application No. 09/444,688, filed on Nov. 22, 1999, now abandoned.

(51) Int. Cl.[7] ............................ B01J 31/00; B01J 37/00; C08F 4/02; C08F 4/60
(52) U.S. Cl. ...................... 502/102; 502/103; 502/113; 502/115; 526/114
(58) Field of Search .................. 502/102, 113, 502/115; 526/114

(56) References Cited

U.S. PATENT DOCUMENTS

| | | | |
|---|---|---|---|
| 4,659,685 A | 4/1987 | Coleman, III et al. | 502/113 |
| 4,665,046 A | * 5/1987 | Campbell, Jr. | 502/102 |
| 4,701,432 A | 10/1987 | Welborn, Jr. | 502/113 |
| 5,124,418 A | 6/1992 | Welborn, Jr. | 526/114 |
| 5,145,818 A | 9/1992 | Tsutsui et al. | 502/113 |
| 5,395,810 A | 3/1995 | Shamshoum et al. | 502/113 |
| 5,399,622 A | 3/1995 | Geerts et al. | 525/268 |
| 5,529,965 A | 6/1996 | Chang | |
| 5,719,235 A | 2/1998 | Zandona | 526/114 |

FOREIGN PATENT DOCUMENTS

| | | |
|---|---|---|
| EP | 536104 | 4/1993 |
| EP | 965601 | 12/1999 |
| EP | 974601 | 1/2000 |

OTHER PUBLICATIONS

US 5,242,876, 09/1993, Shamshoum et al. (withdrawn)
"Field Desorption Mass Spectrometry Studies of the Samarium–Catalyzed Polymerization of Ethylene under Hydrogen", Evans et al., *Macromolecules*, 1995, 28, pp. 7929–7936.
"Highly Reactive Organolanthanides. Systematic Routes to and Olefin Chemistry of Early and Late Bis(pentamethylcyclopentadienyl) 4f Hydrocarbyl and Hydride Complexes", Jeske, et al. *J. Am. Chem. Soc.*, 1985, 107, pp. 8091–8103.
"Metalation as a Termination Step in Polymerization Reactions Involving α–Olefins and Ethylene as Detected by Field Desorption Mass Spectrometry", Evans, et al., *Organometallics*, 1996, 15, pp. 3210–3221.
"Organolanthanides in Catalysis", Watson et al.,*Acc. Chem. Res.*, 1985, 18, pp. 51–56.
"Ethylene Insertion and β–Hydrogen Elimination for Permethylscandocene Alkyl Complexes. A Study of the Chain Propagation and Termination Steps in Ziegler–Natta Polymerization of Ethylene", Burger, et al., J. Am. Chem. Soc., 1990, 112, pp. 1566–1577.
"Synthesis and X–ray Crystal Structure of Bis(pentamethylcyclopentadienyl) Complexes of Samarium and Europium: $(C_5Me_5)_2Sm$ and $(C_5Me_5)_2EU$", Evans et al., *Organometallics*, vol. 5, No. 7, Jul. 1986, pp. 1285–1291.
"Synthesis and Crystallographic Characterization of and Unsolvated, Monomeric Bis(pentamethylcyclopentadienyl) Organolanthanide Complex $(C_5Me_5)_2Sm^{1,2}$", Evans et al.,*J. Am. Chem Soc.*, 1984, 106, pp. 4270–4272.
"Reactivity of $(C_5Me_5)_2Sm$ and Related Species with Alkenes: Synthesis and Structural Characterization of a Series of Organosamarium Allyl Complexes", Evans et al., *J. Am. Chem Soc.*, 1990, 112, 2314–2324.

* cited by examiner

*Primary Examiner*—Mark L. Bell
*Assistant Examiner*—J. Pasterczyk

(57) ABSTRACT

A catalyst composition for polymerization of olefins comprising: (ia) a catalyst precursor corresponding to the formula: $Mg_dTi(OR^e)_eX_f(ED)g$, wherein $R^e$ is an aliphatic or aromatic hydrocarbon radical having 1 to 14 carbon atoms or COR' wherein R' is an aliphatic or aromatic hydrocarbon radical having 1 to 14 carbons atoms; X is halide; ED is an organic Lewis base electron donor; d is 0.5 to 56; e is 0, 1, or 2; f is 2 to 116; and g is 1.5d+2 (ib) an aluminum trialkyl or aluminum alkyl halide cocatalyst compound; and (ii) a lanthanide compound represented by the following formula: $Cp_aLnR^b_bL_c$ wherein Cp is a cyclopentadienyl or substituted cyclopentadienyl ligand; Ln is a lanthanide metal; $R^b$ is a hydride, alkyl, silyl, halide, or aryl group; L is an electron donor; a+b is the valence of the lanthanide metal; and c is a number from 1 to 8.

8 Claims, No Drawings

MIXED METAL CATALYSTS

CROSS REFERENCE STATEMENT

This application is a continuation of U.S. application Ser. No. 09/444,688, filed Nov. 22, 1999, now abandoned.

TECHNICAL FIELD

This invention relates to a mixed metal catalyst, which will be effective in producing a resin having low and high density components.

BACKGROUND INFORMATION

For film blowing applications, it is desirable to have at least some high molecular weight, high density resin to increase bubble stability together with lower molecular weight, low density resin for processability. While this can be accomplished in two or more reactors, it would be desirable commercially to produce a high density/low density resin in a single reactor from the point of view of efficiency. Thus, industry is seeking catalysts, which are effective in the production of such a resin.

DISCLOSURE OF THE INVENTION

An object of this invention, therefore, is to provide a catalyst composition, which will produce a resin having both high and low density characteristics in a single reactor. Other objects and advantages will become apparent hereinafter.

According to the present invention such a catalyst composition has been discovered. The composition comprises (i) a supported or unsupported magnesium/titanium based catalyst precursor including an electron donor and (ii) a lanthanide catalyst precursor represented by the following formula: $Cp_aLnR^b_bL_c$ wherein Cp is a cyclopentadienyl or substituted cyclopentadienyl ligand; Ln is a lanthanide metal; $R^b$ is a hydride, alkyl, silyl, halide, or aryl group; L is an electron donor; a+b is the valence of the lanthanide metal; and c is a sufficient amount of electron donor to stabilize the lanthanide metal.

DESCRIPTION OF THE PREFERRED EMBODIMENT(S)

The supported or unsupported magnesium/titanium based catalyst including an electron donor can be exemplified by one where the precursor is formed by spray drying and used in slurry form. Note: the terms catalyst and catalyst precursor or precursor will be used interchangeably in this specification. Such a catalyst precursor, for example, contains titanium, magnesium, and an electron donor, and, optionally, an aluminum halide. The precursor is introduced into a hydrocarbon medium such as mineral oil to provide a slurry. This spray dried catalyst is described in U.S. Pat. No. 5,290,745. Other processes are described in U.S. Pat. Nos. 5,601,742 and 4,482,687. In whichever manner the catalyst precursor is produced, the precursor is preferably suspended in an inert, high viscosity fluid, e.g., a moderately high viscosity mineral oil.

A typical magnesium/titanium based catalyst system can be described as follows: The precursor can have the formula $Mg_dTi(OR^e)_eX_f(ED)_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; ED is an electron donor; d is 0.5 to 56; e is 0, 1, or 2; f is 2 to 116; and g is 1.5d+2. It is prepared from a titanium compound, a magnesium compound, and an electron donor. Titanium compounds, which are useful in preparing these precursors, have the formula $Ti(OR^e)_eX_h$ wherein $R^e$, X, and e are as defined above; h is an integer from 1 to 4; and e+h is 3 or 4. Some specific examples of titanium compounds are $TiCl_3$; $TiCl_4$; $Ti(OC_2H_5)_2Br_2$; $Ti(OC_6H_5)Cl_3$; and $Ti(OCOCH_3)Cl_3$. $TiCl_3$ and $TiCl_4$ are preferred compounds. The magnesium compounds include magnesium halides such as $MgCl_2$, $MgBr_2$, and $MgI_2$. Anhydrous $MgCl_2$ is a preferred compound. About 0.5 to about 56, and preferably about 1 to about 10, moles of the magnesium compounds are used per mole of titanium compound.

The electron donor is an organic Lewis base, liquid at temperatures in the range of about 0 degrees C. to about 200 degrees C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate. Alcohol containing electron donors which react with the transition metal halide compounds are not preferred.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

Supports can be used with the magnesium/titanium based catalyst precursor although they are not preferred. In those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Cocatalysts that are compatible with the magnesium/titanium based catalyst precursor are generally used in the polymerization process. Cocatalysts that can be used with the described precursor are compounds of the formula $R_nAlX_{3-n}$ wherein each R is independently a saturated aliphatic hydrocarbon radical having 1 to 14 carbon atoms; each X is a halogen, preferably independently chlorine, bromine, or iodine; and n is 1 to 3. Examples of the R radical are methyl, ethyl, n-butyl, isobutyl, n-hexyl and n-octyl. The cocatalyst is preferably added to the reactor in the same inert diluent as the catalyst precursor. Preferred cocatalysts include diethyl aluminum chloride, triethyl aluminum, tri-n-hexyl aluminum, dimethyl aluminum chloride, tri-n-octyl aluminum, and mixtures thereof. The cocatalysts can also be represented by the formulas $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine.

Examples of hydrocarbyl aluminum cocatalysts, in addition to those mentioned above, are as follows: tri-isobutylaluminum, di-isobutyl-aluminum hydride, dihexyla-luminum hydride, di-isobutyl-hexylaluminum, isobutyl dihexylaluminum, trimethylaluminum, tripropylaluminum, triisopropylaluminum, tri-n-butylaluminum, tridecylaluminum, tridodecylaluminum, tribenzylaluminum, triphenylaluminum, trinaphthylaluminum, tritolylaluminum, isoprenylaluminum, dibutylaluminum chloride, diisobutylaluminum chloride, and ethylaluminum sesquichloride. The above cocatalyst compounds can also be used for preactivation or partial activation or as modifiers.

As noted above, the lanthanide catalyst is represented by the formula $Cp_aLnR_bL_c$ wherein Cp is a cyclopentadienyl or substituted cyclopentadienyl ligand; Ln is a lanthanide metal; each $R^b$ is independently a hydride, alkyl, silyl, halide, or aryl group; L is an electron donor; a+b is the valence of the lanthanide metal; and c is a sufficient amount of electron donor to stabilize the lanthanide metal. The alkyl can have 1 to 20 carbon atoms; the halide can be chloride, bromide, or iodide; and the aryl group can have 1 to 3 benzene rings.

The cyclopentadienyl or substituted cyclopentadienyl ligands are exemplified by the cyclopentadienyl or substituted cyclopentadienyl ligands per se and substituted or unsubstituted indenyl and fluorenyl ligands.

More specific examples of these ligands are as follows: 4,5,6,7-tetrahydroindenyl; 2-methylindenyl; 2-methyl-4,5,6,7-tetrahydroindenyl; 2,4,7-trimethylindenyl; 2-methyl-4-phenylindenyl; 2-methyl-4-isopropylindenyl; 2-methyl-4-naphthylindenyl; 2,4-dimethylcyclopentadienyl; and 2-methyl-4-t-butylcyclopentadienyl.

The lanthanide metals include yttrium and those rare earth elements 58 to 71 of the Periodic Table, i.e., Ce, Pr, Nd, Pm, Sm, Eu, Gd, Tb, Dy, Ho, Er, Tm, Yb, and Lu. The preferred elements are samarium, europium, and ytterbium.

The electron donor can be one of those electron donors mentioned above provided that it is compatible with the ligand and the lanthanide metal. It is present in a sufficient amount to stabilize the lanthanide metal. While an excess of electron donor is used initially for this purpose, the complex can finally contain about 1 to about 8 moles of electron donor per gram atom of lanthanide metal and preferably contains about 1 to about 3 moles of electron donor per gram atom of lanthanide metal.

The atomic ratio of aluminum to titanium can be in the range of about 10:1 to about 150:1, and is preferably in the range of about 20:1 to about 40:1. The atomic ratio of aluminum to lanthanide metal can be about 1:1 to about 100:1, and is preferably in the range of about 5:1 to about 40:1.

High speed extrusion bubble stability is an important factor in blown film extrusion processes. A blown film extrusion process is one in which molten polymer is forced through an annular die to form a continuous cylindrical tube. Outside the die, the tube is blown out to a larger diameter than the die diameter, cooled by an air ring, and then flattened before wind-up. The ratio of the final diameter of the cylindrical tube to the diameter of the annulus is called the blow-up ratio (BUR). The combination of the extrusion rate, BUR, and the speed with which the tube is drawn out determines the final film thickness. The ability to produce thinner films at higher rates of extrusion is governed by many factors including the molecular and rheological characteristics of the molten polymer, dependence of properties on temperature, and the design of the air ring.

The entire cylindrical tube between the die and the collapsing frame (where the tube is flattened) is called the "bubble". This is a cylindrical bubble in contrast to traditionally familiar spherical bubbles in which air, or some other gas, is enveloped by a thin liquid film. Here, air is used to blow a thin molten polymer film. Although the cross-section (circular) of the bubble does not change, the bubble looks conical from the outside because of a change in the diameter until the solidification at the frost-line height (FLH). Sometimes, e.g., with high density polyethylene, the bubble looks like a cylindrical semi-molten tube with a diameter approximately equal to the ring diameter before being blown out into a larger diameter. Past the FLH, however, the shape does not change from a circular cylindrical tube of constant diameter. Note that between the die and the FLH the bubble is always semi-molten.

One would like to produce a final film with close tolerance in film thickness under stable conditions of operation, i.e., the shape of the bubble remains the same without any change over time. The highest extrusion rate and the highest wind-up speed that can be used without changing the shape of the bubble provides the operating constraints for a given resin in a given system (extruder, air ring, cooling air temperature, etc.). For example, at a given extrusion rate, if one can increase the wind-up speed to make thinner film without losing the shape of the bubble, then the resin is said to have good high speed extrusion bubble stability.

The measurement of TREF is a technique, well recognized by those skilled in the art. The acronym stands for Temperature Rising Elution Fractionation. When more than 5 (preferably more than 10) percent by weight of the resin has an elution temperature greater than 90 degrees C., a broad comonomer distribution is indicated. The TREF values are stated in percent of the resin, which elutes out as follows: The low density fraction is the weight percent of resin which elutes out at less than 60 degrees C. and has a density of less than about 0.91 gram per cubic centimeter. The high density fraction is the weight percent of resin which elutes out at temperatures greater than 90 degrees C. and has a density greater than about 0.93 gram per cubic centimeter.

In a typical process:

The flow index of the resin product can be in the range of about 0.01 to about 30 grams per 10 minutes, and is preferably in the range of about 0.1 to about 20 grams per 10 minutes. The molecular weight of the polymer is, generally, in the range of about 135,000 to about 550,000. The density of the copolymer can be at least 0.860 gram per cubic centimeter, and is preferably in the range of 0.91 to 0.97 gram per cubic centimeter. The melt flow ratio of the polymer can be in the range of about 20 to about 70, and is preferably about 22 to about 45.

Melt index is determined under ASTM D-1238, Condition E. It is measured at 190 degrees C. and 2.16 kilograms and reported as grams per 10 minutes. Flow index is determined under ASTM D-1238, Condition F. It is measured at 190 degrees C. and 10 times the weight used in determining the melt index, and reported as grams per 10 minutes. Melt flow ratio is the ratio of flow index to melt index.

The mixed catalyst system, ethylene, alpha-olefin, and, optionally, hydrogen are continuously fed into the reactor; and the final product is continuously removed from the reactor. The mole ratio of alpha-olefin to ethylene can be in the range of about 0.01:1 to about 0.4:1, and is preferably in the range of about 0.02:1 to about 0.3:1. The mole ratio of hydrogen (if used) to ethylene can be in the range of about 0.001:1 to about 0.3:1, and is preferably in the range of about 0.017:1 to about 0.18:1. The operating temperature is generally in the range of about 60 degrees C. to about 100 degrees C. Preferred operating temperatures vary depending on the density desired.

In a commercial process the pressure, i.e., the total pressure in the reactor, can be in the range of about 200 to about 450 psi and is preferably in the range of about 280 to about 400 psig. The ethylene partial pressure can be at least about 25 psi and is preferably at least about 30 psi. The balance of the total pressure is provided by alpha-olefin other than ethylene and an inert gas such as nitrogen.

A typical fluidized bed reactor can be described as follows: The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

A typical fluidized bed reactor is described in U.S. Pat. No. 4,482,687.

The gaseous feed streams of ethylene, other gaseous alpha-olefins, and hydrogen, if used, are preferably fed to the reactor recycle line as well as liquid alpha-olefins and the cocatalyst solution. Optionally, the liquid cocatalyst can be fed directly to the fluidized bed. The partially activated or completely activated mixed catalyst precursor is preferably injected into the fluidized bed as a solid or a mineral oil slurry. In the case of partial activation, activator is added to the reactor. The product composition can be varied by changing the molar ratios of the comonomers introduced into the fluidized bed. The product is continuously discharged in granular or particulate form from the reactor as the bed level builds up with polymerization. The production rate is controlled by adjusting the catalyst feed rate.

The hydrogen:ethylene molar ratio can be adjusted to control average molecular weights. The alpha-olefins (other than ethylene) can be present in a total amount of up to 15 percent by weight of the copolymer and, if used, are preferably included in the copolymer in a total amount of about 1 to about 10 percent by weight based on the weight of the copolymer.

Several steps can be taken, in addition to temperature control, to prevent agglomeration. The product discharge line between the reactor and the product pot is often plugged up with chunks between intervals of product drops. A continuous purge flow of nitrogen or reactor gas in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, avoidance of quick change of gas composition, selective use of static-neutralizing chemicals and surface passivation with aluminum alkyls.

It is preferred to control the static in the reactor system during start-up. If the static is not controlled, static induced layers of catalyst rich fines can form on the reactor surfaces. These fines may, in turn, induce localized hot spots and the formation of chunks. Reactor surface passivation with an aluminum alkyl minimizes the formation of fines layers. This passivation is accomplished by first building up the aluminum alkyl concentration in the start-up bed to about 300 to 1000 ppm based on the weight of the bed, and then fluidizing the bed with purified nitrogen or ethylene for several hours. At the end of this passivation period, the reactor is purged while maintaining the circulation, the reaction conditions are established, and the reaction is kicked off by feeding catalyst into the system. If static still persists, additional purges or selective use of static neutralizing chemicals may become necessary to reduce the level of static.

The residence time of the mixture of reactants including gaseous and liquid reactants, catalyst, and resin in the fluidized bed can be in the range of about 1 to about 12 hours and is preferably in the range of about 1 to about 5 hours.

There are many variations of the typical process described above, which are well known to those skilled in the art., and these can be used with the mixed catalyst of the invention.

The polyolefins, which can be produced using the mixed catalyst of this invention, are, generally, homopolymers or copolymers produced from two or more comonomers, or a blend of two or more of these polymers, conventionally used in film, sheet, and tubing, and as jacketing and/or insulating materials in wire and cable applications. The monomers useful in the production of these homopolymers and copolymers can have 2 to 20 carbon atoms, and preferably have 2 to 12 carbon atoms. Examples of these monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene, commonly the third monomer in a terpolymer; other monomers such as styrene, p-methyl styrene, alpha-methyl styrene, p-chloro styrene, vinyl naphthalene, and similar aryl olefins; nitriles such as acrylonitrile, methacrylonitrile, and alpha-chloroacrylonitrile; vinyl methyl ketone, vinyl methyl ether, vinylidene chloride, maleic anhydride, vinyl chloride, vinylidene chloride, vinyl alcohol, tetrafluoroethylene, and chlorotrifluoroethylene; and acrylic acid, methacrylic acid, and other similar unsaturated acids. In addition to polyolefins, included among the polymers can be polyesters, polycarbonates, and polyurethanes.

The homopolymers and copolymers referred to can be non-halogenated, or halogenated in a conventional manner, generally with chlorine or bromine. Examples of halogenated polymers are polyvinyl chloride, polyvinylidene chloride, and polytetrafluoroethylene. The homopolymers and copolymers of ethylene and propylene are preferred, both in the non-halogenated and halogenated form. Included in this preferred group are terpolymers such as ethylene/propylene/diene monomer rubbers.

Other examples of ethylene polymers are as follows: a copolymer of ethylene and one or more alpha-olefins having 3 to 12 carbon atoms, preferably 3 to 8 carbon atom and a copolymer of an alpha-olefin having 2 to 12 carbon atoms and an unsaturated ester having 4 to 20 carbon atoms, e.g., an ethylene/ethyl acrylate or vinyl acetate copolymer. Reference can also be made to polyethylenes of various densities (high, medium, linear low, very low, and ultra-low) wherein the comonomer is 1-butene, 1-hexene, 4-methyl-1-pentene, or 1-octene; ethylene/propylene rubber; ethylene/propylene/diene monomer rubber; ethylene/vinyl acetate copolymer; ethylene/ethyl acrylate copolymer; isobutylene/isoprene rubber and polybutene-1. Low pressure, high density polyethylene can be referred to as HDPE; low pressure straight chain low density ethylene/alpha-olefin copolymer can be referred to as LLDPE; and low pressure straight chain very low density ethylene/alpha-olefin copolymer can be referred to as VLDPE.

With respect to polypropylene: homopolymers and copolymers of propylene and one or more other alpha-olefins wherein the portion of the copolymer based on propylene is at least about 60 percent by weight based on the weight of the copolymer can be used to provide the polyolefin of the invention. The polypropylene can be prepared by conventional processes such as the process described in U.S. Pat. No. 4,414,132. The alpha-olefins in the copolymer are preferably those having 2 or 4 to 12 carbon atoms.

The homopolymer or copolymers can be crosslinked or cured with an organic peroxide, or to make them hydrolyzable, they can be grafted with an alkenyl trialkoxy silane in the presence of an organic peroxide which acts as a free radical generator or catalyst. Useful alkenyl trialkoxy silanes include the vinyl trialkoxy silanes such as vinyl trimethoxy silane, vinyl triethoxy silane, and vinyl triisopropoxy silane. The alkenyl and alkoxy radicals can have 1 to 30 carbon atoms and preferably have 1 to 12 carbon atoms.

The homopolymers or copolymers of ethylene wherein ethylene is the primary comonomer and the homopolymers and copolymers of propylene wherein propylene is the primary comonomer may be referred to herein as polyethylene and polypropylene, respectively.

Hydrolyzable polymers can be cured with moisture in the presence of a conventional silanol condensation catalyst such as dibutyltin dilaurate, dioctyl tin maleate, stannous acetate, and stannous octoate.

The resin product can be extruded into film in a conventional extruder adapted for that purpose. Extruders and processes for extrusion are described in U.S. Pat. Nos. 4,814,135; 4,857,600; 5,076,988; and 5,153,382. Examples of various extruders, which can be used in forming the film are a single screw type such as one modified with a blown film die and air ring and continuous take off equipment, a blown film extruder, and a slot cast extruder. For the purposes of this specification, extrusion processes shall be considered to include conventional extrusion processes such as blown tubular film extrusion and pipe and sheet extrusion, and blow molding, injection molding, rotational molding, and slot casting. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C., and is preferably carried out at temperatures in the range of about 180 to about 240 degrees C. In wire coating, where the material is crosslinked after extrusion, the die of the crosshead feeds directly into a heating zone, and this zone can be maintained at a temperature in the range of about 130 to about 260 degrees C., and preferably in the range of about 170 to about 220 degrees C.

A description of a typical blow molding apparatus can be found in the Blow Molding Handbook, edited by Rosato et al, published by Oxford University Press, New York, 1989. Typical conditions are described at pages 530 to 535.

The advantage of the invention is as follows: The quantity of high and low density components of the resin can be controlled in a single reactor without the use of expensive alumoxane cocatalysts.

Conventional additives, which can be introduced into the resin, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer. Fillers can be added in amounts up to 200 parts by weight and more for each 100 parts by weight of polymer.

Patents, patent applications, and publications mentioned in this specification are incorporated by reference herein.

Molecular weights are weight average molecular weights unless otherwise noted.

The invention is illustrated by the following examples.

EXAMPLES 1 to 12

Synthesis of $SmI_2THF_4$

In a 250 milliliter Ehrlenmeyer flask in a glovebox, 8.48 grams of white (sublimed under vacuum) 1,2-diiodoethane (30 millimoles) is added along with excess samarium metal (47 grams, 312 millimoles). Dry degassed tetrahydrofuran (THF) [dried over sodium and sodium benzophenone ketyl and vacuum transferred prior to use, 150 milliliter] is added and the mixture stirred. The mixture quickly changes from colorless to yellow ($SmI_3$) as a gas is released. Over a period of several hours, the mixture turns from yellow to green to dark blue ($SmI_2$). The dark blue mixture is filtered to remove excess metal and the dark blue solution is dried under vacuum. The yield of dark blue crystals is 23.52 grams (100 percent).

Synthesis of $Cp*_2SmTHF_2$

In a 250 milliliter Ehrlenmeyer flask in a glovebox, 14.61 grams of $SmI_2THF_4$ (26.6 millimoles) is added along with sodium pentamethylcyclopentadienyl (100 milliliters, 0.50 Molar, 50 millimoles). Dry degassed tetrahydrofuran (THF) [dried over sodium and sodium benzophenone ketyl and vacuum transferred prior to use, 150 milliliter] is added and the mixture stirred. The mixture turns from dark blue to dark purple over a period of several hours. The dark purple mixture is filtered to remove white solids and the dark purple filtrate is dried under vacuum. The isolated dark purple solids are dissolved in 100 milliliters of dried degassed toluene (dried in the same manner as THF, above). This dark purple mixture is filtered again to remove more white solids, and the dark purple filtrate is then dried under vacuum to yield dark purple crystals (11.74 grams, 80 percent).

$^1$H-NMR of Cp*$_2$SmTHF$_2$ in d$_8$-toluene: 18.19 (THF), 4.19 (THF), and 2.40 ppm (Me). These broad resonances shift based on the concentration of paramagnetic Sm.

Polymerization

A one liter autoclave computer operated reactor with a magna drive using mixtures of steam and water to control temperature is used to evaluate polymerization activity. Ethylene, nitrogen, hydrogen, and hexane are passed through individual sets of cylinders containing de-oxo catalyst and 4 Angstrom sieves before entering the reactor. 1-Hexene is passed through activated alumina, dried over 4 Angstrom sieves, and degassed with nitrogen before use.

The reactor is dried by heating to 110 degrees C. with steam while purging with a flow of nitrogen for 30 minutes. Hexane (500 milliliters; if 1-hexene is added, the amount is reduced by the amount of 1-hexene), 1-hexene (total volume of 500 milliliters), and TEAL (triethylaluminum) [syringed using a polypropylene syringe] are added to the reactor. The reactor is heated to 30 degrees C. before the hydrogen is added. The temperature is then raised to 65 degrees C. before the ethylene is added (150 psi total if 1-hexene is added, otherwise 200 psi total). Catalyst is then injected using a glass and Teflon™ syringe at 65 degrees C. The stirring speed is 700 rpm. The run time is typically 20 to 30 minutes after which the pressure is carefully vented and the reactor is cooled before opening. The polymer is isolated by evaporation, treated with an antioxidant Irganox™ 1076, dried in a vacuum oven at 55 degrees C. for one hour, and pulverized in a blender before analysis.

Since lanthanide compounds are oxophilic, it is useful to have an aluminum alkyl present to scavenge poisons (examples 2 to 6). The activity of the lanthanide catalyst, Cp*$_2$SmTHF$_2$, increases as expected. Little to no incorporation of comonomer occurs as shown by the high density of the resin produced. TREF shows the percent of high density to be 95 percent. TREF measures branching frequency and SEC (size exclusion chromatography) measures molecular weight.

The use of hydrogen significantly increases the molecular weight and decreases the activity (examples 7 and 8). The variables and results are shown in Table I.

TABLE I

| Examples | Al/Ln atomic ratio | H$_2$ counts | 1-hexene (mL) | activity | MI | MFR | density |
|---|---|---|---|---|---|---|---|
| 1 | 0 | 0 | 60 | 7,451 | 108 | — | — |
| 2 | 5 | 0 | 60 | 46,870 | 2.9 | 23 | 0.953 |
| 3 | 22 | 0 | 60 | 160,932 | 11 | 41 | 0.962 |
| 4 | 25 | 0 | 60 | 159,494 | 1.1 | 29 | 0.953 |
| 5 | 28 | 0 | 60 | 465,765 | 45 | 23 | 0.962 |
| 6 | 37 | 0 | 60 | 352,951 | 59 | 7 | — |
| 7 | 10 | 50 | 0 | 35,620 | 347 | — | — |
| 8 | 31 | 50 | 0 | 39,237 | 484 | — | — |

Synthesis of Mixed Catalyst

The mixed catalyst is made by adding solid Cp*$_2$SmTHF$_2$ to a conventional magnesium/titanium based catalyst precursor in a mineral oil slurry. The samarium complex is also slightly soluble in the mineral oil changing the color from a gray solid slurried in colorless oil to a dark purple mixture. The dark color of the mixture (especially the dark colored oil) is a good indication that the samarium did not reduce the titanium species since samarium (III) compounds tend to be light yellow to red in color. The dark color persists over a period of several months. The magnesium/titanium precursor is comprised of a spray dried combination of TiCl$_3$, MgCl$_2$, THF, a fumed silica filler, and mineral oil.

Typical synthesis of mixed catalyst containing 17 mole percent samarium: 7.54 grams of magnesium/titanium based catalyst precursor in a mineral oil slurry is well slurried before weighing. The titanium loading is 0.146 millimole of titanium per gram of slurry. To the slurry is added 0.13 gram of Cp*$_2$SmTHF$_2$ and 17.00 grams of mineral oil. The calculated loading of is 0.0446 millimole titanium per gram of slurry and 0.0094 millimole samarium per gram of slurry.

The mixed catalyst slurries are rolled until well dispersed before aliquots are taken for polymerization reactions.

The procedure is repeated with a change of loading to provide mixed catalysts having 31 and 70 mole percent samarium. Catalysts having 0 mole percent samarium and 100 mole percent samarium are also provided.

Polymerization Conditions for Gas Phase Reactor:

Bake-out: The reactor is dried by heating to 100 degrees C. with steam while purging with a flow of nitrogen for one hour. The reactor is cooled to 85 degrees C. and 50 grams of polyethylene (0.918 g/cc density and 1.0 g/10 min MI) starter bed is added, stirred, and heated at 85 degrees C. for 30 minutes with a nitrogen flow. Then, 5 milliliters of TEAL (1.56 Molar) is added at 85 degrees C. and stirred under static nitrogen at 15 psi for an additional 15 minutes after which the reactor is purged with nitrogen while stirring for 15 minutes.

After the bake-out is completed, the amount of TEAL, which is used for the polymerizations, is added along with 10 milliliters of 1-hexene at 85 degrees C. Hydrogen (8000 cc) and ethylene (140 psi total) are added and the catalyst precursor is then injected using a glass and Teflon™ syringe. The run time is one hour after which the pressure is reduced by venting, and the reactor is cooled before opening. The polymer is isolated, treated with an antioxidant, and the yield and activity are calculated without including the amount of the starter bed.

Polymerizations using the magnesium/titanium catalyst precursor (without the samarium complex) and mixed catalyst containing 17, 31, and 70 mole percent samarium are carried out using the above stirred bed, gas phase procedure. Solid Cp*$_2$SmTHF$_2$ is added to the mineral oil slurry of the magnesium/titanium based catalyst precursor and the mixture is well dispersed before polymerization. There is no evidence of a reaction of the samarium with the titanium. The amount of titanium and the moles of TEAL per gram atom of titanium are kept constant. Therefore, any increase in activity is due to the samarium present. The variables and results are set forth in Table II.

TABLE II

| Examples | mole % Sm | Al/Ti atomic ratio | Al/Ln atomic ratio | H$_2$ counts | 1-hexene (mL) | activity |
|---|---|---|---|---|---|---|
| 9 | 0 | 31 | 0 | 8,083 | 10 | 223 |
| 10 | 17 | 33 | 158 | 7,983 | 10 | 1,618 |
| 11 | 31 | 29 | 66 | 8,007 | 10 | 1,950 |
| 12 | 70 | 33 | 14 | 7,988 | 10 | 2,336 |

The activity of the catalyst increases dramatically for 223 to 2,336 as the amount of samarium is increased from 0 to 70 mole percent. Typically, the conventional magnesium/titanium catalyst will uptake a maximum of 2.5 liters per minute in three minutes before steadily decreasing to 0.5 liter per minute. On the other hand, the mixed catalyst rapidly consumes ethylene to the limits of the flow controller for the duration of the polymerization (60 minutes). The resin characterization data is summarized in Table III.

TABLE III

| Example | 9 | 10 | 11 | 12 |
|---|---|---|---|---|
| MI | 1.6 | 4.1 | 2.1 | 1.0 |
| MFR | 39 | 33 | 35 | 34 |
| density | 0.935 | 0.947 | 0.947 | 0.946 |
| TREF % LD | 22 | 9 | 7 | 8 |
| TREF % HD | 32 | 69 | 69 | 74 |
| BF SCB/1000 | 15 | 7 | 6 | 6 |
| SEC Mn | 26,534 | 19,100 | 22,714 | 26,903 |
| SEC Mw | 128,502 | 83,178 | 96,308 | 122,110 |
| SEC PDI | 4.7 | 4.4 | 4.2 | 4.5 |

The samarium is clearly producing high density resin as shown by the increasing density (0.935 to 0.946); decreasing short chain branching frequency (15 to 6 per 1000); and increasing high density component as measured by TREF (32 to 74%). Further, mixing a magnesium/titanium based catalyst with a lanthanide catalyst does not necessarily increase the molecular weight distribution (PDI averages 4.5 for all samarium concentrations).

Notes to Tables:
activity=grams of polyethylene/[millimole of Sm/hour/100 psi ethylene].
MI=melt index
MFR=melt flow ratio
Density is measured in gram per cubic centimeter according to ASTM D1505-68.
10 $H_2$ counts=100 cubic centimeters of hydrogen
TREF % LD=percent low density resin as measured by TREF
TREF % HD=percent high density resin as measured by TREF
BF SCB/1000=branching frequency-short chain branches per 1000 carbon atoms
SEC=size exclusion chromatography
Mn=number average molecular weight
Mw=weight average molecular weight
PDI=polydispersity index (Mw/Mn)

What is claimed is:

1. A catalyst composition for polymerization of olefins comprising:

(ia) a catalyst precursor corresponding to the formula: $Mg_dTi(OR^e)_eX_f(ED)g$, wherein $R^e$ is an aliphatic or aromatic hydrocarbon radical having 1 to 14 carbon atoms or $COR'$ wherein $R'$ is an aliphatic or aromatic hydrocarbon radical having 1 to 14 carbon atoms; each $OR^e$ group is the same or different; X is independently chlorine, bromine or iodine; ED is an organic Lewis base electron donor; d is 0.5 to 56; e is 0, 1, or 2; f is 2 to 116; and g is 1.5d+2

(ib) a cocatalyst compound of the formula $R_nAlX_{3-n}$ wherein each R is independently a saturated aliphatic hydrocarbon radical having 1 to 14 carbon atoms; each X is a halogen, and n is 1 to 3; and (ii) a lanthanide compound represented by the following formula: $Cp_aLnR^b_bL_c$ wherein Cp is a cyclopentadienyl or substituted cyclopentadienyl ligand; Ln is a lanthanide metal; $R^b$ is a hydride, alkyl, silyl, halide, or aryl group; L is an electron donor; a+b is the valence of the lanthanide metal; and c is a number from 1 to 8.

2. The composition defined in claim 1 wherein the electron donor is tetrahydrofuran.

3. The composition defined in claim 1 wherein, in the lanthanide compound, $R^b$ is an alkyl group of from 1 to 20 carbon atoms.

4. The composition defined in claim 1 wherein, in the lanthanide compound, the lanthanide metal is samarium.

5. The composition defined in claim 1 wherein the lanthanide compound is bis(pentamethylcyclopentadienylsamarium $(THF)_2$.

6. A process for the polymerization of olefins comprising contacting the composition defined in any one of claims 1–5 under polymerization conditions with one or more olefin monomers.

7. The process defined in claim 6 wherein the olefin monomers are ethylene and one or more alpha-olefins.

8. The process defined in claim 7 wherein the product comprises a homopolymer of ethylene and a copolymer of ethylene and one or more alpha-olefins.

* * * * *